United States Patent [19]
Rabilloud et al.

[11] Patent Number: 4,736,015
[45] Date of Patent: Apr. 5, 1988

[54] AROMATIC POLYIMIDE COMPOSITIONS OF HIGH SOLUBILITY AND THEIR USES

[75] Inventors: Guy Rabilloud, Grenoble; Michel Senneron, Meylan; Choua Cohen, Lyons; Paul Mariaggi, Seyssuel; Bernard Sillion, Rocquencourt, all of France

[73] Assignee: Institut Francais du Petrole, Rueil-Malmaison, France

[21] Appl. No.: 435,153

[22] Filed: Oct. 19, 1982

[30] Foreign Application Priority Data

Oct. 19, 1981 [FR] France .................. 81 19733

[51] Int. Cl.[4] .............................. C08G 69/26
[52] U.S. Cl. .................. 528/353; 528/125; 528/128; 528/188; 528/185; 528/220; 528/228; 528/229; 528/352
[58] Field of Search .............. 528/125, 128, 188, 185, 528/220, 228, 229, 352, 353

[56] References Cited

U.S. PATENT DOCUMENTS

| | | | |
|---|---|---|---|
| 3,609,123 | 9/1971 | Rabilloud et al. | 528/220 |
| 3,793,291 | 2/1974 | Cohen et al. | 528/188 |
| 3,933,745 | 1/1976 | Bargain et al. | 528/229 |
| 3,939,109 | 2/1976 | Barie et al. | |
| 4,489,185 | 12/1984 | Schoenberg | 524/104 |

Primary Examiner—John Kight
Assistant Examiner—M. L. Moore
Attorney, Agent, or Firm—Millen & White

[57] ABSTRACT

Aromatic polyimide compositions, useful in particular for manufacturing adhesive materials, varnishes and films withstanding high temperatures, having a high solubility in organic solvents, particularly polar solvents and which are manufactured by reacting, in such a solvent, a tetraester or diacid-diester of benzhydrol 3,3', 4, 4' tetracarboxylic acid with an aromatic diamine for a sufficient time to obtain a polycondensation reaction product having an inherent viscosity at 30° C., at a concentration of 5 g/liter in N-methyl pyrrolidone, ranging from 0.1 to 2 dl/g.

51 Claims, No Drawings

AROMATIC POLYIMIDE COMPOSITIONS OF HIGH SOLUBILITY AND THEIR USES

BACKGROUND OF THE INVENTION

The present invention concerns new aromatic polyimide compositions having a particularly high solubility in many organic solvents and excellent adhesive properties. These compositions may be used as binding agents in the manufacture of composite materials, as insulating varnishes for the coating and enameling of metal conductors, as base for elaborating adhesive compositions, foams and cellular materials and as protecting films able to withstand high temperatures.

The invention concerns more particularly the polymer compositions obtained by reacting an aromatic diamine with a diacid-diester or a tetra-ester derived from benzhydrol 3,3',4,4'-tetracarboxylic acid at a sufficiently high temperature to produce the formation of aromatic polyimides.

It is known that aromatic polyimides are polymers generally infusible and not or not very soluble in the organic solvents. For this reason, it is necessary to make use of operating techniques which either require an intermediate non cyclized soluble polymer or a mixture of fusible reactants which, by a suitable thermal treatment, may give a polymer material.

In the first technique, the polyimide is prepared in two successive steps. During the first step, a reaction of polycondensation between an aromatic diamine and a tetracarboxylic acid dianhydride in a polar aprotic organic solvent gives a solution of polyamide-acid of high molecular weight. This solution must be kept in the cold and protected from moistness since it is sensitive to heat and to hydrolysis.

The second step of the manufacturing process consists of making use of a solution generally containing from 10 to 20% by weight of polyamide-acid in order to prepare a polymer film by progressive evaporation of the solvent. The transformation of the polyamide-acid to a polyimide film is effected by thermal or chemical dehydration. It is obvious that this technique limits the use of polyimides to the manufacture of films or coating materials of small thickness since, in addition to the removal of 80 to 90% by weight of the solvent, it is also necessary to eliminate one mole of water formed by cyclization, for each reactive center.

This technique is illustrated by the U.S. Pat. No. 3 939 109, according to which the dianhydride of benzhydrol tetracarboxylic acid is reacted with 4,4'-diaminodiphenylether to prepare a solution of polyamide-acid in dimethylacetamide. This solution is then used to manufacture polyimide films of a 0.025 mm thickness. Now, as indicated in the U.S. Pat. No. 3 293 267, benzhydrol dianhydride is liable to react with its own alcohol groups to give esters which, on the one hand, change the stoichiometry of the reactants and, on the other hand, decrease the thermal stability of the polymers.

The general method for the preparation of aromatic polyimides, as above described, is, in the present state of the art, the most broadly used in spite of the restraints associated thereto. As a matter of fact, it requires monomers of very high purity, the severe elimination of water, a limited solvent selection, very critical conditions for the synthesis and the preservation of the polymers. With thermal treatments adapted to the solvents and to the polymers, it is however possible to make use of polyamide-acids for synthesizing aromatic polyimides usable as films, varnishes and adhesives.

Another known method for the preparation of aromatic polyimides consists of replacing the tetracarboxylic acid dianhydrides by their reaction products with primary aliphatic alcohols, i.e. by the corresponding alkyl diesters or tetraesters. This technique is described by V. L. Bell (Polymer Letters, 1967, 5, 941-946) and in the U.S. Pat. No. 3 700 649, for the alkyl diesters or pyromellitic and benzophenone 3,3',4,4'-tetracarboxylic acids and various aromatic diamines. The monomer mixture is converted to polyimides by progressive heating under nitrogen atmosphere up to 300° C. As the polycondensation reaction is effected at the melting of the reactants, only the monomers which give fusible polymers may lead to high polymers. In the other cases insoluble and infusible oligomers of low molecular weight are formed, as shown in the comparative examples 1 and 2 of the present invention.

This technique is also illustrated by the French Pat. No. 2 031 847 according to which the esters of metaphenylene bis-4-(hydroxymethylene phthalic) acid are reacted with aromatic diamines to prepare soluble polyimides. In this case the solubility of the polymers is obtained by an increase of the number of carbinol linkages in the recurrent unit of the polymer, which considerably limits the field of application of these products, since the preparation of the basic monomer requires five successive operations whose total yield is about 50%. In addition, the increase of the number of carbinol linkages results in a decrease of the thermal stability and of the resistance to oxidation of the polyimides. This phenomenon is well known in all the families of heterocyclic polymers where the addition of flexible linkages is used to increase the solubility.

SUMMARY OF THE INVENTION

It has been discovered, and this is one of the objects of the invention, that certain monomers derived from benzhydrol do not suffer from any of the above-mentioned drawbacks. As a matter of fact, these monomers lead quite surprisingly to the formation of aromatic polyimides soluble in many organic solvents. The polycondensation reaction may thus be performed, in an optimum manner, in a suitable solvent until free monomers have substantially disappeared from the medium and the polymer reaches the desired viscosity.

The invention has more particularly for object soluble aromatic polyimide compositions prepared by reacting at last one aromatic diamine of the general formula:

with at least one aromatic compound of the general formula:

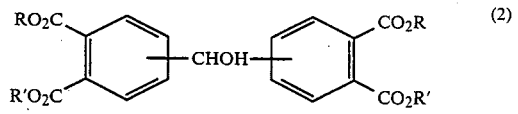

In these formulae, the radical Ar is a divalent carbocyclic or heterocyclic aromatic radical, the two valencies of which are on separate carbon atoms, not in ortho position with respect to each other. The radical Ar may be formed of one or more rings (for example 2 to 6 rings), which are then joined side by side or interconnected, each ring being preferably formed of 5 to 7 atoms, a part of which may consist of oxygen, sulfur and/or nitrogen atoms.

When the radical Ar comprises several interconnected rings, the connecting elements may for example consist of a direct bond or of one of the following atoms or groups:

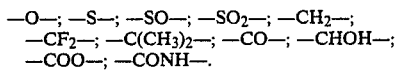

R and R', identical or different, are monovalent hydrocarbon radicals, each preferably containing from 1 to 13 carbon atoms, for example lower alkyl radicals containing from 1 to 13 carbon atoms, cycloalkyl or aryl radicals containing 6 to 13 carbon atoms. In this case, the compound formula (2) is a tetraester or a mixture of tetraesters of benzhydrol 3,3',4,4'-tetracarboxylic acid. The radical R may also be a hydrogen atom, R' being defined as above and the compound formula (2) is then a bis-orthoacid-ester, more simply identified as a diester of benzhydrol 3,3',4,4'-tetracarboxylic acid. The carbinol linkage separating two aromatic rings of benzhydrol is placed at the middle of the carbon-carbon bonds of these rings to indicate the possible isomerisms.

DETAILED DISCUSSION

Among the diamines which are convenient for the present invention, there can be mentioned 1,3 and 1,4-diaminobenzene, 3,3' and 4,4'-diaminodiphenyl methane, 3,3' and 4,4'-diaminodiphenyl ether, benzidine, 3,3' and 4,4'-diaminodiphenyl sulfide, 3,3' and 4,4'-diaminodiphenyl sulfone, 3,3', (4,4',), (3,4') and 3',4-diaminobenzanilide, 3,3' and 4,4' diaminophenyl benzoate, bis(4-amino phenyl)dimethyl silane, 2,4, (2,6) and 3,5 diamino pyridine, 3,3' dimethoxy benzidine, 3,3' and 4,4'-diamino benzophenone, 3,3' and 4,4'-diamino benzhydrol.

Among the derivatives of benzhydrol 3,3',4,4'-tetracarboxylic acid which are convenient for the present invention, there can be mentioned the symmetrical tetraesters, i.e. the compounds of formula (2) wherein radicals R and R' are identical, such as tetramethyl ester, tetraethyl ester, tetrabutyl ester; the asymmetrical tetraesters corresponding to formula (2) with alkyl and/or aryl, different radicals R and R' such as dimethyl diphenyl ester, dimethyl dibutyl ester, diethyl diphenyl ester; the bis(ortho-acid-esters) more simply called diesters, i.e. the compounds of formula (2) wherein R is a hydrogen atom and R' an alkyl radical, such for example as methyl diester, ethyl diester, n-propyl diester, isopropyl diester, n-butyl diester, isobutyl diester, amyl diester, hexyl diester, 2-hydroxyethyl diester.

In the most usual case, the asymmetrical tetraesters and diesters of benzhydrol 3,3',4,4'-tetracarboxylic acid are not pure compounds but a mixture of isomers. For example, the methyl diester may be a mixture, in variable proportions, of 3,3'-dicarboxy 4,4'-dimethoxycarbonyl benzhydrol with 4,4'-dicarboxy 3,3'-dimethoxycarbonyl benzhydrol and 3,4'-dicarboxy 4,3'-dimethoxycarbonyl benzhydrol.

The polyimide compositions of the invention may be used in very different application fields and the reaction conditions are in part selected in accordance with the contemplated use. The nature and the amount of solvent, the temperature, the duration, the rate of progress of the polycondensation reaction may vary very widely depending on whether a varnish, a film, an adhesive, a binder or any other thermostable product is to be prepared.

In the preferred embodiment, a resinous composition of polyimides is prepared by dissolving in a suitable solvent an aromatic diamine of formula (1) and, preferably, a substantially equimolecular amount of an aromatic compound of formula (2). Of course, the stoichiometric proportions, as in any polycondensation reaction, are those which give polymers of the higher molecular weight, but, for some applications, it is impossible to make use of an excess of one or the other of the monomers. However, it is preferable that the discrepancy with respect to the stoichiometrical proportions be smaller than 50% and, preferably from 0 to 20% by mole. The reaction mixture formed by the solvent and the reactants is then heated up to a temperature advantageously higher than 80° C., preferably from 100° to 250° C., until the composition reaches the desired viscosity, the polycondensation reaction product having an inherent viscosity of 0.1 to 2 dl/g, preferably 0.15 to 1 dl/g at 30° C. in a concentration of Sg/l in N-methyl pyrrolidone.

The solvents which can be used to prepare the compositions of the invention are polar organic compounds, i.e. compounds containing a heteroatom such as O, N, S, P, inert with respect to the monomers and the polymers. Among these solvents are to be mentioned phenols such as phenol, cresols, xylenols, chlorophenols, glycol mono- and diethers, such for example as as ethyleneglycol and diethyleneglycol diethers, glycol mono- and diesters, such for example as ethyleneglycol and diethyleneglycol mono and diesters, amides such for example as methylformamide, dimethylformamide, hexamethylphosphotriamide, methylacetamide, dimethylacetamide, ureas, such for example as tetramethylurea, heterocyclic compounds, such for example as pyridine, quinoline, dioxane, tetrahydrofuran, N-methylpyrrolidone, N-acetylpyrrolidone, tetramethylenesulfone, the sulfones and sulfoxides, such for example as dimethylsulfone and dimethylsulfoxide.

These solvents may be used alone or admixed with one another or with other liquid organic compounds including alcohols such as methanol, ethanol, propanol, isopropanol, butanols, benzyl alcohol; ketones such, for example, as acetone, 2-butanone, methylisobutylketone, diisopropylketone, cyclohexanone, acetophenone; aromatic hydrocarbons such as benzene, toluene, xylenes, naphtha solvent, halogenated aromatic hydrocarbons such as chlorobenzene, dichlorobenzenes, chlorotoluenes; aliphatic and aromatic esters of aliphatic and aromatic carboxylic acids such for example as methyl-, isopropyl-, butyl-, phenyl-acetates, methyl benzoate; ethers such as dibutyl ether, diphenyl ether.

The monomer initial concentration in the reaction solvent is not critical but is generally from 10 to 80% by weight. At the end of the reaction, the concentration of resinous composition is adjusted to such a value that the solution has a dynamic viscosity well adapted to the contemplated use. In other words, the final concentration depends on the molecular weight of the polymer, on the nature of the one or more solvents and on the operating temperature. In order to make polyimide deposits of very small thickness, it is preferable to make use of highly polymerized compositions at concentrations between 10 and 30% by weight. For other applications, it is advantageous to use polymers of a lower molecular weight at higher concentrations, for example from 30 to 60% by weight.

The temperature of the polycondensation reaction may vary within a wide range, from 80° to 400° C. It is generally set at such a value that the reaction of the amines groups on the benzhydrol tetracarboxylic acid derivatives is effected at a reasonable rate. In accordance with the solvent and the reactants used, a temperature from 100° to 250° C. generally gives good results. The volatile products (water and/or alcohol) formed during the reaction may be kept in the medium but they may also be removed by distillation as they are formed in order to control the rate of progress of the reaction.

The rate of progress of the polycondensation reaction is defined by the ratio of the number of functional groups having reacted to the initial number of said groups. It may be defined in percentage (and, for example, to a rate of progress of 50% corresponds the disappearance of one half of the reactive groups) or in term of rate of reaction (p), such that (p) be comprised between 0 and 1. In this case, the rate of progress of 50% is equivalent to a rate of reaction of 0.5. By definition, the polycondensation degree or PD is given by the relationship $1/1-p$.

The aromatic polyimide compositions of the invention have a particularly high solubility in many organic solvents. Accordingly, it is possible to easily follow the formation of polymers by the usual analysis techniques. The rate of progress of the reaction may be simply determined by measuring the amount of volatile products (water and/or alcohol) distilled during the reaction. This method lacks accuracy towards the end of the reaction when very few reactive centers remain, i.e. when the rate of progress reaches 97 to 99%. It is then advantageous to make use of the determination of the amine, acid and/or ester groups forming the chain termini. The solubility of the polymers makes also possible the use of all the spectroscopy analysis methods (infrared, ultraviolet, nuclear magnetic resonance) for determining the structure of the polymers.

When the polyimide composition is prepared by reaction of an aromatic diamine with an alkyl diester of benzhydrol tetracarboxylic acid, the weight of distillate (water and alcohol) gives the total rate of progress of the reaction. Moreover, from the composition of the distillate, it is possible to know the cyclization rate to imide. As a matter of fact, the reaction of an amine group with an acidester group produces one molecular equivalent of water and one molecular equivalent of alcohol at each time an imide ring is formed. Thus, it has been observed that the compositions of the invention have an imidation rate always higher than 90% and generally from 95 to 100%. This means for example, that 95 to 100% of the amine groups having reacted are involved in imide rings, the remainder being probably in the form of amide-acid and/or amide-ester.

The compositions of the invention are prepared at various degrees of progress, for example from 50 to 99.9%, according to their intended use. For most of the applications it is however preferable to continue the reaction until the rate of progress is comprised between 90 and 99.9%, so as to remove the major part of the volatile compounds before making use of the polymer. A high conversion rate offers in addition the advantage of leaving the medium only very small amounts by weight of the starting monomers.

The aromatic polyimides are known for their good resistance to heat and to oxidation but the maximum stability is only obtained when the polymer is completely cyclized to imide and is substantially free of oxidizable end groups, particularly amine groups. In these two fields, the compositions of the invention have particularly advantageous properties, since the polycondensation reaction and the imidation reaction take place in solution. The analysis of the reaction products shows that both reactions are simultaneous and that they can be controlled over the whole operation period.

For many applications, it is preferable to make use of already highly cyclized polymers, not only in order to increase the thermal stability, but also for having a low evolution of volatile compounds at the time of manufacture. As a matter of fact, the final porosity of the material depends to a large extent on the amount of volatile products which have been removed. The compositions of the invention can be compared to polyimides obtained by other synthesis techniques, used for example in the manufacture of composite materials. When making use, for coating the substrate, of a solution of polyamide-acid prepared according to the usual method, for example with one mole of diamine and one mole of dianhydride, it is necessary, at the time of manufacture, to remove, as steam, two moles of water. According to the usual technique for diesters, the coating is made with a monomer solution containing for example one mole of diester-diacid and one mole of diamine. In this case, it is necessary to remove two moles of water and two moles of alcohol at the time of manufacture. With the composition of the invention, prepared from one mole of aromatic diamine and one mole of a compound of formula (2), there is obtained a very satisfactory coating solution when the degree of progress of the polycondensation is of the order of 98 to 99% with a cyclization rate to imide of at least 98%. At the time of manufacture of the composite material, only a few hundredths of a mole of volatile products are left to remove, which is of considerable advantage.

The soluble polyimide compositions according to the invention have excellent adhesive properties with respect to a large number of materials but, according to the type of use, it may be necessary to adjust the degree of progress of the polycondensation reaction in relation with the optimum viscosity. The polyimide solutions have a viscosity, at equal concentration of dry material, which increases very strongly together with the molecular weight of the polymers beyond a 95% rate of progress of the reaction.

For the types of use requiring a high content of dry material, for example of the order of 60 to 80% by weight, the polyimide solutions are already very viscous when the polymers have an inherent viscosity of 0.15 dl/g. When the latter is comprised between 0.2 and 0.4 dl/g, it is preferable to proceed with slightly lower concentrations, for example between 30 and 50%. With still more diluted solutions, the polymers may have an inherent viscosity higher than 1.5 dl/g. In any case, the polycondensation reaction is achieved at the time of manufacture.

In the manufacturing step the soluble polyimide compositions of the invention offer numerous advantages as compared to the polyimides of the prior art. The transformation to an article of determined shape is effected, after evaporation of the solvent, by a suitable thermal treatment with or without pressure. When the required qualities are mainly the resistance to heat and to oxidation, the compositions are used alone or in association with other thermostable polymers. Moreover, one of the very exceptional advantages of these compositions is that they can be used to increase the thermal stability of certain known polymer substances.

It is known that the best properties of flexibility, elongation, elasticity are obtained with linear polymers of high molecular weight. All these mechanical properties however disappear when the temperature of use becomes close to the glass transition temperature. For a certain number of applications, it is accordingly necessary to crosslink the linear polymers in order to increase the resistance to solvents, the glass transition temperature, the deflection temperature under charge and certain mechanical properties. The compositions of the invention are particularly well adapted for these applications, since they can be easily crosslinked.

The alcohol groups of benzhydrol located along the macromolecular chain of the polymer are in fact available for reacting with other simple polymer compounds containing very reactive groups such as isocyanates, epoxides, alkyl titanates, anhydrides of carboxylic acids, halogenides of carboxylic acids, siloxanes. These reactions are very specific to the polyimides of the invention in view of their solubility and of the very high imidation rates. As a matter of fact, when the above mentioned reactants are added to a polyamide-acid solution, they react preferably with the free carboxylic acid groups or with the water formed during the cyclization to imide rather than with less reactive groups such as the secondary alcohols.

In the case of certain utilizations, it may be advantageous to admix the polyimide compositions with other compositions of monomers or of prepolymers up to a proportion of 50% so as to prepare more highly crosslinked materials. Generally, the mixture is effected in solution before the manufacture with the composition and it is during the final heating that the crosslinking reaction is completed.

Depending on the applications, there can be added to the compositions inert constituents such as pigments, dyes, organic, mineral or metal fillers, adhesive powders, additives for stabilization to heat or oxidation, swelling agents, etc. The shaped articles formed with these compositions are dried to evaporate the solvent and the polycondensation reaction is completed by a suitable thermal treatment at a temperature preferably from 200° to 400° C.

The invention will be described more precisely in connection with the following specific examples, wherein details are given by way of illustration but not limitation. In these examples, the polycondensation reactions are effected under stirring and in inert atmosphere to avoid oxidation of the aromatic amines. The solvents which are used do not need to be perfectly anhydrous, but the water contained therein, if any, must be taken into account when the weight of volatile compounds which distill is used to test the rate of progress of the reaction. As a general rule, the water and/or alcohol formed during the polycondensation, are distilled continuously in order to follow the formation of the polymer.

In these examples, the inherent viscosities, when stated, are measured at 30° C., for a concentration of 5 g of composition per liter of N-methyl pyrrolidone. When another solvent is used for this measurement, its name is indicated with the value of the viscosity. The dynamic viscosities of the solutions are measured at 30° C. with a cone/plane viscosimeter and are expressed in millipascals-second (mPa.s).

The molecular weights, when stated, correspond to average molecular weights by number ($\overline{Mn}$). They are either measured by determination of the end reactive groups, or calculated from the degree of progress of the reaction by the conventional statistical equations ($\overline{Mn} = \overline{Mo}/1\text{-}p$, $\overline{Mo}$ being the average molecular weight of the structural recurrent unit and p the degree of progress measured).

For sake of simplicity in writing the names of the chemical products, the mixtures of isomer compounds are designated by a term in the singular as for example the methyl diester of benzhydrol 3,3',4,4'-tetracarboxylic acid.

The presence of cyclic imide linkages in the obtained soluble polymers when proceeding as described in the examples according to the invention have been determined by conventional analysis methods: elementary analysis, reaction with hydrazine hydrate, infrared spectrometry, proton nuclear magnetic resonance, carbon-13 nuclear magnetic resonance and thermo-gravimetric analysis.

Examples 1, 2, 22 and 23 are given by way of comparison.

EXAMPLE 1

(comparative)

A mixture of 28.22 g (0.1 mole) of methyl diester of pyromellitic acid, 20 g (0.1 mole) of bis(4-amino phenyl)ether and 48 g of N-methyl pyrrolidone is heated at 140° C. When the temperature of the mixture reaches 118° C., a pale beige precipitate is progressively formed whose weight rapidly increases with the reaction time. After two hours of heating, about 0.1 mole of water and 0.1 mole of methanol have been removed by distillation, which corresponds to a rate of progress of the reaction of 50%. The so-obtained mixture of products is not soluble in organic solvents and its melting temperature is higher than 250° C.

By extraction with boiling ethanol, there is obtained 4.8 g of diamine i.e. 22% by weight of the initial amount. The obtained mixture is thus formed of oligomers of low molecular weight and of the initial reactants. Being insoluble and hardly fusible, such a mixture cannot have practical applications.

EXAMPLE 2

(comparative)

In the conditions of example 1, an amount of 38.63 g (0.1 mole) of the methyl diester of benzophenone 3,3',4,4'-tetracarboxylic acid is reacted with 19.8 g (0.1 mole) of bis(4-amino phenyl)methane in 58 g of N-methyl pryrrolidone. As in the preceding example, an insoluble and infusible precipitate of oligomers is formed which contains 18% by weight of the initial diamine amount. This mixture can be used to prepare shaped articles.

EXAMPLE 3

A mixture of 38.83 g (0.1 mole) of the methyl diester of benzhydrol 3,3'4,4'-tetracarboxylic acid with 20 g of bis(4-amino phenyl)ether and 50 g of N-methyl pyrrolidone is heated to 140° C. The solution remains limpid all over the heating period and the polymer formation is followed by measuring its inherent viscosity after 2 h, 4 h, 6 h, 9 h, 13 h and 24 h of reaction. The obtained values are respectively 0.1, 0.15, 0.20, 0.25, 0.30, and 0.36 dl/g. The red coloured limpid solution contains, at the end of the reaction, a polymer proportion of 46% and has a dynamic viscosity of 12000 mPa.s. After dilution with 10 g of ethanol and 8 g of xylene, it is used to spread a film over a glass plate. The film is dried in a stove with forced ventilation at 100° C. for 1 hour and then 2 hours at 200° C. The film is separated from the support by immersion in water for 24 h and then treated for 20 min. at 300° C. At the end of this operation, a flexible and strong yellow-orange polyimide film is obtained.

EXAMPLE 4

A mixture of 388.34 g of methyl diester of benzhydrol 3,3′,4,4′-tetracarboxylic acid with 198.27 g of bis(4-amino phenyl)methane in 535 g of m-cresol is poured in an oil bath heated at 170° C. After 15 minutes, the temperature of the mixture reaches 110° C. and the first drops of distillate appear at the top of the column. In Table I, this time is referred to as the reaction zero time wherefrom is calculated the reaction time, the temperature of the solution, the weight of distillate and the polycondensation degree (PD).

TABLE 1

| REACTION TIME IN MIN. | TEMPERATURE IN °C. | WEIGHT OF DISTILLATE IN g | POLYMERIZATION DEGREE |
|---|---|---|---|
| 0 | 110 | 0 | 1 |
| 4 | 118 | 7.8 | 1.1 |
| 5.8 | 121 | 16.7 | 1.2 |
| 7.5 | 122 | 24.9 | 1.3 |
| 9.5 | 122 | 33.2 | 1.5 |
| 11.8 | 124 | 41 | 1.7 |
| 15.5 | 126 | 48.8 | 1.9 |
| 20.5 | 129 | 56.9 | 2.3 |
| 28.7 | 131 | 65.6 | 2.9 |
| 39 | 141 | 73.4 | 3.8 |
| 54.7 | 145 | 81.5 | 5.4 |
| 70 | 149 | 89.8 | 9.8 |
| 240 | 155 | 96.5 | 28.5 |
| 420 | 160 | 97.7 | 41.6 |

After 7 hours of reaction, the weight of the distillate is 97.7 g, whereas at 100% of conversion, it should be 100.12 g. The total rate of progress is accordingly 97.6%, which gives an average calculated molecular weight from 10 000 to 12 000. The analysis of the terminal reactive groups gives an average molecular weight of 10 800 and a cyclization rate to imide higher than 96%.

The polyimide composition has an inherent viscosity of 0.505 dl/g. In m-cresol, it is 0.62 dl/g. The concentration of dry material, which is 47.7%, is reduced to 35% by addition of xylene in order to obtain a solution having a viscosity of 2600 mPa.s. It can then be used to spread a polyimide layer on various metal substrates such as copper, aluminum, titanium and steel. After drying, a thermal treatment for 15 minutes at 300° C. gives a flexible and very adhesive coating on the different metals.

EXAMPLE 5

A mixture of 416.39 g of ethyl diester of benzhydrol 3,3′,4,4′-tetracarboxylic acid with 200.24 g of bis(4-amino phenyl)ether and 600 g of N-methyl pyrrolidone is poured in an oil bath heated to 150° C. After 3 hours of reaction, the temperature of the solution is 140° C., the progress of the polycondensation is 76% and the inherent viscosity is 0.17 dl/g. The temperature of the oil bath is then increased to 160° C. One hour later, the temperature of the solution is 154° C., the rate of progress 82% and the viscosity 0.3 dl/g. Finally, the mixture is heated for 2 hours at 170° C., i.e. an internal temperature of 164° C., to obtain a composition having a viscosity of 0.41 dl/g with a rate of progress of 95%.

The perfectly limpid solution is precipitated under very strong stirring in 5 liters of methanol. The polymer is washed with boiling methanol, with water, then dried under vacuum at 90° C. for 24 hours. The yield of solid polymer amounts to 487.2 g (about 100%).

An adhesive composition is prepared by dissolving the solid product in dioxane at a concentration of 30% by weight. After 15 minutes of reflux in the solvent and cooling at room temperature, there is obtained a pale red coloured limpid solution, having a viscosity of 2800 mPa.s.

EXAMPLE 6

A polyimide composition is prepared by heating at 200° C. for 3 hours, 42 g of 3,3′,4,4′-tetramethoxycarbonyl benzhydrol, 20 g of bis(4-amino phenyl)ether and 55 g of m-cresol. At the end of the reaction the inherent viscosity is 0.33 dl/g and the dynamic viscosity 8200 mPa.s.

EXAMPLES 7 to 17

A series of soluble aromatic polyimide compositions is prepared by reacting equimolecular amounts (0.1 mole) of methyl diester of benzhydrol 3,3′,4,4′-tetracarboxylic acid with various aromatic diamines. The reaction conditions (nature of the amine and of the solvent, temperature and reaction time) are reported in Table 2. In this Table, also, the adhesive compositions are characterized by the value of their inherent viscosity. In all of these examples, the initial monomer concentration is 50% by weight in the mentioned solvent. The short terms used are as follows:

MDA, methylene-dianiline; ODA, oxydianiline; DABA, diaminobenzaniline; DABP, diaminobenzophenone; MPDA, metaphenylenediamine; DABH, diamino-benzhydrol; DADP, diaminodiphenyl; DADPS, diaminodiphenylsulfone; DMAC, dimethylacetamide; NMP, N-methylpyrrolidone; HMPT, hexamethylphosphotriamide; XYL, 3,4-xylenol; MCP, metachlorophenol.

TABLE 2

| EXAMPLE No. | DIAMINE | SOLVENT | T °C. | TIME h | INHERENT VISCOSITY dl/g |
|---|---|---|---|---|---|
| 7 | MPDA | NMP | 175 | 6 | 0.54 |
| 8 | 4,4′-MDA | diglyme | 150 | 4 | 0.17 |
| 9 | 4,4′-MDA | dioxane | 110 | 24 | 0.28 |
| 10 | 4,4′-ODA | DMAC | 150 | 4 | 0.23 |
| 11 | 4,4′-ODA | XYL | 225 | 6 | 0.81 |
| 12 | 3,3′-DABA | MCP | 210 | 6 | 0.69 |
| 13 | 4,4′-DABP | NMP | 170 | 7 | 0.48 |
| 14 | 3,3′-DABH | HMPT | 160 | 6 | 0.52 |
| 15 | 4,4′-DABH | cresol | 200 | 8 | 0.94 |
| 16 | 4,4′-DADP | XYL | 205 | 3 | 0.30 |
| 17 | 4,4′-DADPS | XYL | 225 | 6 | 0.42 |

EXAMPLE 18

A polyimide composition prepared as in example 4 with an inherent viscosity of 0.5 dl/g is precipitated in methanol in order to obtain a cream coloured fibrous solid. 30 g of this product are dissolved in 48 g of dioxane to which are added 14 g of diglycidylether of bisphenol-A (DGEBA) having 0.504 epoxy group per 100 g. When the solution has become perfectly limpid, it is progressively heated above 100° C. to evaporate the solvent. The temperature is then brought from 120° to 190° C. in 30 minutes. The honey coloured homogeneous mixture, initially very viscous, progressively solidifies. After 30 minutes at 190° C., the product becomes infusible and insoluble.

The preceding operation is repeated with 16 g of polyimide composition, 4 g of DGEBA and 25 g of dioxane. The reaction is effected by heating at 130° C. for 30 minutes in order to obtain a very viscous solution which is used to deposit a film on a glass plate. The solvent is evaporated for 1 hour at 100° C. and the film is cross-linked by heating at 150° C., 170° C. and 200° C., respectively during 15 minutes, 30 minutes and 2 hours. The crosslinked polyimide film very strongly adheres to the glass.

EXAMPLE 19

A mixture of 32 g of polyimide of example 18, 7.2 g of bis(4-isocyanato phenyl)methane and 90 g of dioxane is heated for 1 hour at 100° C. The solvent is then distilled and the mixture is heated to 150° C. for 10 minutes, then to 200° C. for 15 minutes. It first gives a transparent gel and then an infusible and insoluble solid.

The preceding operation is repeated with 8.44 g of polyimide, 20.6 g of dioxane and 0.5 g of diisocyanate. After 1 hour of heating at 100°-110° C., the solution is used to spread a film over a glass plate. A thermal treatment at 100°, 150° and 200° C., respectively for 45 minutes, 2 hours and 15 minutes, gives a cross-linked film strongly adhered to the glass and insensitive to solvents.

EXAMPLE 20

A polyimide composition is prepared with 388 g of methyldiester of benzhydrol 3,3',4,4'-tetracarboxylic acid and 198 g of bis(4-amino phenyl)methane, in a mixture of 200 g of xylenol and 200 g of cresol. The reaction is effected for 2 h at 130° C., 2 h at 150° C. and 3 h at 200° C., then the mixture is diluted with 30% by weight of dry material by addition of a solvent mixture containing one volume of cresol, 1 volume of ethanol and 2 volumes of xylene. After cooling at 60° C., 20 g of tetrabutyl titanate is added as crosslinking agent and the solution is heated for 1 hour at 120° C. The dynamic viscosity of the solution is 3000 mPa.s. It is used to deposit on a metal conductor a layer of flexible and adhesive insulating varnish which strongly adheres to the metal.

The polyimides obtained as described in the examples of the invention, optionally shaped as films, coatings, varnishes, etc . . . are homogeneous non-porous materials.

EXAMPLE 21, EXAMPLES 22 and 23

(comparative)

By way of comparison, three compositions of polyimides or polyimine precursors are prepared according to the technique of the invention and to the prior art processes.

COMPOSITION A (example 21 according to the invention)

A reaction is conducted at 200° C. for 4 hours between equimolecular amounts of methyl diester of benzhydrol 3,3',4,4'-tetracarboxylic acid and of bis(4-amino phenyl)methane dissolved in N-methyl pyrrolidone, with a 50% initial concentration of dry material. After 3 hours of reaction, the solution is diluted by progressive addition of the same solvent to reach a final concentration of 20%. The obtained polymer has an inherent viscosity of 0.9 dl/g and a cyclization rate to imide higher than 97%.

COMPOSITION B (comparative example 22)

A resinous composition of polyimide precursors is prepared by admixing in equimolecular amounts methyldiester of benzophenone 3,3',4,4'-tetracarboxylic acid and bis(4-amino phenyl)methane in N-methyl pyrrolidone on order to obtain a 40% concentration of dry material.

COMPOSITION C (comparative example 23)

A polyamide-acid solution is prepared by progressively adding 1 mole of benzophenone tetracarboxylic anhydride to 1 mole of bis(4-amino phenyl)ether in solution in N-methyl pyrrolidone. At the end of the reaction at room temperature, the concentration of dry material is 15% and the polyamide-acid has an inherent viscosity of 1.15 dl/g.

The compositions A, B and C are used to adhere standardized test pieces of stainless steel destined to measure the longitudinal shear strength. The surfaces to be adhered are coated with the preceding solutions and the solvent is evaporated in a stove with forced ventilation during 30 minutes at 100° C. and 30 min. at 150° C. The test pieces are placed by pairs in an adhesion guide which ensures a covering of 1.27 cm of the ends coated with adhesive. They are then placed between the plates of a hydraulic press heated at 220° C. and maintained for 6 hours at said temperature under a pressure of 5 bars. They are then reheated in a stove for 1 hour at 280° C., 10 hours at 300° C. and 1 hour at 325° C.

The longitudinal shear strength is measured with a pulling machine which gives the following values at test temperatures of 20°, 200° and 250° C.

Composition A: 300–340 kg/cm$^2$, 270–310 kg/cm$^2$ and 200–220 kg/cm$^2$

Composition B: 200–210 kg/cm$^2$, 200–210 kg/cm$^2$ and 150–160 kg/cm$^2$

Composition C: 220–240 kg/cm$^2$, 210–220 kg/cm$^2$ and 110–130 kg/cm$^2$

The optical examination of the breaking surfaces shows that for the composition A of the polyimides according to the invention, the glue joint is homogeneous and free of bubbles whereas the compositions B and C produce irregular surfaces with many bubbles and swelling zones.

In another test, portions of the above described solutions are used to impregnate a glass fabric E-181 with a stiffening agent containing γ-aminopropyltriethoxysilane. The impregnation is effected in several steps on both faces of the fabric with solvent evaporation at each step to obtain a pre-impregnated fabric containing 35 to 37% of resin. Each pre-impregnated fabric is cut out into 12 identical elements of 20×20 cm which are superposed and placed between the plates of a hydraulic press heated to 250° C. After 2 minutes of contact, a pressure of 15 bars is applied and the temperature is increased up to 300° C. in 30 minutes and maintained to this value for 3 hours before cooling and ejecting the stratified materials.

The homogeneity of the materials is determined by the calculation of the void percentage according to the specification LP 406 B methods 5011 and 7061 for measuring the specific gravity of the stratified material and its resin content.

The calculated volume of stratified material is given by the formula:

$$x = \frac{m_s R}{m_r} + \frac{m_s V}{m_v}$$

wherein $m_s$, $m_r$ and $m_v$ are the respective specific gravities of the stratified material, of the resin and of glass. R and V are, in decimal form, the percentages of the resin and glass in the stratified material.

The stratified materials prepared with compositions A, B and C have void percentages respectively of 1, 21 and 13%. The pre-imidated resins of the invention thus give much more homogeneous and compact materials as a result of the absence of volatile compounds.

Another advantage of the polyimide compositions of this invention is shown by the unaltered properties, under storage conditions, of pre-impregnated glass fabrics used to manufacture stratified materials. When these fabrics are kept in free air, at room temperature, the following phenomena are observed:

Composition A: The pre-impregnated material keeps its pale yellow colour and is not subject to any change during one year.

Composition B: The pre-impregnated material becomes brown and then black in less than one week as a result of the diamine oxidation.

Composition C: The pre-impregnated material becomes brown and the polyamide-acid is progressively degraded in 1 month. Its inherent viscosity, which was initially 1.15 dl/g, has fallen to a value of 0.3 dl/g.

What is claimed is:

1. A polyimide composition of high solubility, in polar organic solvents which is manufactured by reacting at least one aromatic diamine with at least one tetraester or diacid-diester derived from benzhydrol 3,3',4,4'-tetracarboxylic acid, under conditions which effect polycondensation and imide cyclization thereof, the reaction being continued until an inherent viscosity of at least 0.1 dl/g and at most 2 dl/g is obtained, said viscosity being measured in N-methyl pyrrolidone at 30° C. at a concentration of 5 g of composition per liter of N-methyl pyrrolidone, and to a rate of progress of 90–99.9%, thereby removing a major part of the volatile polycondensation/imidization products.

2. A composition according to claim 1, wherein said reaction is effected in a polar solvent at a temperature from 100° to 250° C.

3. A composition according to claim 2, wherein said polar solvent is selected from phenols, glycol ethers, glycol esters, amides, dimethylsulfoxide, dimethylsulfone, tetramethylurea, dioxane, pyridine, quinoline, N-methyl pyrrolidone, N-acetyl pyrrolidone, hexamethylphosphotriamide and tetramethylenesulfone.

4. A composition according to claim 1, wherein said reaction is continued until said inherent viscosity is at least 0.15 dl/g and at most 1 dl/g.

5. A composition according to claim 1, wherein said at least one diamine has the formula:

wherein Ar is a divalent, carbocyclic or heterocyclic aromatic radical, the $NH_2$ groups being fixed to separate carbon atoms of said radical, not located in ortho position with respect to each other; and wherein said at least one tetraester or diacid-diester has the formula:

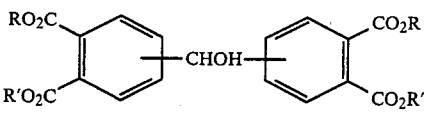

wherein R' is a monovalent hydrocarbon radical and R is a hydrogen atom or a monovalent hydrocarbon radical.

6. A composition according to claim 5, the wherein said aromatic diamine is bis(4-amino phenyl)ether, and said tetraester or diacid-diester is the ethyl diester of benzhydrol 3,3',4,4'-tetracarboxylic acid.

7. A composition according to claim 5, wherein said aromatic diamine is bis(4-amino phenyl)methane, and said tetraester or diacid-diester is the methyl diester of benzhydrol 3,3',4,4'-tetracarboxylic acid.

8. A composition according to claim 5, wherein said aromatic diamine is bis(4-amino phenyl)ether, and said tetraester or diacid-diester is 3,3',4,4'-tetramethoxycarbonyl benzhydrol.

9. A solution comprising 10 to 80% by weight of a polyimide composition according to claim 1, in an organic solvent.

10. A solution according to claim 9, wherein at least a major part by weight of said organic solvent is a polar solvent.

11. A composition according to claim 10, wherein said crosslinking agent is selected from epoxides, isocyanates, alkyl titanates, anhydrides and halogenides of carboxylic acids and siloxanes.

12. A composition according to claim 11, wherein said crosslinking agent is diglycidyl ether or bis-phenol-A.

13. A composition according to claim 11, wherein said crosslinking agent is bis(4-isocyanato phenyl)methane.

14. A composition according to claim 11, wherein said crosslinking agent is tetrabutyl titanate.

15. A method according to claim 13, wherein the substrate is a metal or glass.

16. A method according to claim 13, wherein the substrate is a glass fabric.

17. An article of manufacture produced by the process of claim 15.

18. In a method of forming an adhesive layer on a substrate, wherein a layer of a solution of an adhesive composition is deposited on said substrate, and the layer is dried and heated to produce an adhesive coating,
the improvement wherein said solution is a solution according to claim 9.

19. A solution according to claim 10, wherein said polar solvent is selected from phenols, glycol ethers, glycol esters, amides, dimethylsulfoxide, dimethylsulfone, tetramethylurea, dioxane, pyridine, quinoline, N-methyl pyrrolidone, N-acetyl pyrrolidone, hexamethylphosphotriamide and tetramethylenesulfone.

20. A crosslinked polyimide composition produced by crosslinking a polyimide composition according to claim 1 with a monomer or a prepolymer crosslinking agent containing at least two reactive functional groups for reacting with benzhydrol alcohol groups on the polyimide to crosslink the polymer chains.

21. A composition according to claim 5, wherein Ar is a single aromatic 5–7-membered carbocyclic ring or heterocyclic ring containing any of oxygen, sulfur or nitrogen heteroatoms.

22. A composition according to claim 5, wherein Ar is formed of 2–6 aromatic 5–7-membered carbocyclic and/or oxygen-, sulfur- and/or nitrogen-containing heterocyclic rings, said rings being fused, linked by a single bond and/or linked by at least one of —O—, —S—, —SO—, —SO$_2$—, —CH$_2$—, —CF$_2$—, —C(CH$_3$)$_2$—, —CO—, —CHOH—, —COO— and —CONH—.

23. A composition according to claim 5, wherein each R and R' is independently a monovalent C$_{1-13}$ alkyl radical or a C$_{6-13}$ cycloalkyl or aryl radical.

24. A composition according to claim 5, wherein R is H, and each R' is independently a monovalent C$_{1-13}$ alkyl radical or a C$_{6-13}$ cycloalkyl or aryl radical.

25. A composition according to claim 1, wherein said diamine and said tetraester or diacid-diester are reacted in substantially equimolar proportions.

26. A composition according to claim 1, wherein 95–100% of the amine groups of said diamine are cyclized to imide groups in said polyimide.

27. A composition according to claim 1, wherein said reaction is continued to a conversion of about 98–99% and a degree of imidization of at least 98%.

28. A composition according to claim 1, wherein the molar proportion of diamine to tetraester or diacid-diester is 0.67:1 to 1.5:1.

29. A composition according to claim 25, wherein the molar proportion of diamine to tetraester or diacid-diester is 0.83:1 to 1.2:1.

30. A carbinol containing polyimide curable at temperatures of about 200°–400° C., which is prepared by reacting a 3,3+,4,4'-benzhydrol tetracarboxylic diester-diacid, with a polyfunctional heterocyclic or aromatic primary amine using a molar ratio of 0.67:1 to 1.5:1, the reaction being carried out in an inert organic solvent at a temperature sufficient to effect polymerization and imidization and at a rate of progress of 90–99.9%, thereby removing a major part of the volatile polycondensation/imidization products.

31. The polyimide of claim 30, wherein the solvent is a polar solvent.

32. The polyimide of claim 30, wherein the polyimide has an intrinsic viscosity of 0.1 to 2 when determined on 0.5 g/dl solutions at 30° C. in N-methyl pyrrolidone.

33. The polyimide of claim 30, wherein the amine is selected from the group consisting of 4,4'-methylenedianiline, 4,4'-oxydianiline, 4,4'-sulfonyldianiline, 4,4'-bis(3-aminobenzoyl)diphenyl ether, m-phenylenediamine, bis(3-aminopropyl)tetramethyl disiloxane, and 1,3-bis(3-aminophenoxy)benzene.

34. The polyimide of claim 32, wherein a mixture of the bis(methyl half-ester) of 3,3',4,4'-benzhydroltetracarboxylic acid and the bis (methyl half-ester) of 3,3+,4,4'-benzophenone tetracarboxylic acid is used.

35. An organic solution containing a carbonyl containing polyimide, useful for preparing an adhesive film curable at 200°–400° C., which is prepared by reacting a molar excess of a 3,3',4,4'-benzhydroltetracarboxylic diester-diacid, with an aromatic diamine selected from the group consisting of 4,4'-methylenedianiline, 4,4'-oxydianiline, 4,4'-sulfonyldianiline, 4,4'-bis(3-aminobenzoyl)diphenyl ether, m-phenylenediamine, bis(3-aminopropyl)tetramethyl disiloxane, and 1,3-bis(3-aminophenoxy)benzene using a molar ratio of up to 1.5:1, the reaction being carried out in an inert polar organic solvent at between about 100°–250° C. and at a rate of progress of 90–99.9%, thereby removing a major part of the volatile polycondensation/imidization products.

36. A process for preparing a polyimide curable at temperatures of 200°–400° C., which comprises the steps of:
(a) reacting a 3,3',4,4'-benzhydroyltetracarboxylic diester-diacid compound with an aromatic diamine at about 100°–150° C. in an inert polar organic solvent using a molar ratio of tetracarboxylic acid compound to diamine of 0.67:1 to 1.5:1; and at a rate of progress of 90–99.9%, and
(b) removing the water and/or alcohol byproducts.

37. A composition according to claim 5, wherein said tetraester is selected from the group consisting essentially of the tetramethyl, tetraethyl, tetrabutyl, dimethyl diphenyl, dimethyl dibutyl and diethyl diphenyl esters of benzhydrol 3,3',4,4'-tetracarboxylic acid.

38. A composition according to claim 37, wherein said tetraester is 3,3',4,4'-tetramethoxy carbonyl benzhydrol.

39. A composition according to claim 5, wherein the diamine is 1,3-diaminobenzene, 1,4-diaminobenzene, 3,3'-diaminodiphenyl methane, 4,4'-diaminodiphenyl methane, 3,3'-diaminodiphenyl ether, 4,4'-diaminodiphenyl ether, benzidine, 3,3'-diaminodiphenyl sulfide, 4,4'-diaminodiphenyl sulfide, 3,3'-diaminodiphenyl sulfone, 4,4'-diaminodiphenyl sulfone, 3,3'-diaminobenzanilide, 4,4'-diaminobenzanilide, 3,4'-diaminobenzanilide, 4,3'-diaminobenzanilide, 3,3'-diaminophenyl benzoate, 4,4'-diaminophenyl benzoate, bis(4-amino phenyl)dimethyl silane, 2,4-diamino pyridine, 2,6-diamino pyridine, 3,5-diamino pyridine, 3,3'-dimethoxy benzidine, 3,3'-diamino benzophenone, 4,4'-diamino benzophenone, 3,3+-diamino benzhydrol, 4,4'-diamino benzhydrol.

40. A composition according to claim 5, wherein the tetraester or diacid-diester is a mixture of 3,3'-dicarboxy-4,4'-dimethoxycarbonyl benzhydrol, 4,4'-dicarboxy-3,3'-dimethoxycarbonyl benzhydrol and 3,4'-dicarboxy-4,3+-dimethoxycarbonyl benzhydrol.

41. A composition according to claim 5, wherein said aromatic diamine is bis(4-amino phenyl)ether and said tetraester or diacid-diester is the methyl diester of benzhydrol 3,3+4,4'-tetracarboxylic acid.

42. A composition according to claim 5, wherein said tetraester or diacid-diester is the methyl diester of 3,3'4,4'-tetracarboxylic acid and said aromatic diamine is m-phenylene diamine.

43. A composition to claim 5, wherein said tetraester or diacid-diester is the methyl diester of 3,3'4,4'-tetracarboxylic acid and said aromatic diamine is 4,4'-methylene dianiline.

44. A composition according to claim 5, wherein said tetraester or diacid-diester is the methyl diester of 3,3',4,4'-tetracarboxylic acid and said aromatic diamine is 4,4'-oxydianiline.

45. A composition according to claim 5, wherein said tetraester or diacid-diester is the methyl diester of 3,3',4,4'-tetracarboxylic acid and said aromatic diamine is 3,3'-diaminobenzaniline.

46. A composition according to claim 5, wherein said tetraester or diacid-diester is the methyl diester of 3,3',4,4'-tetracarboxylic acid and said aromatic diamine is 4,4'-diaminobenzophenone.

47. A composition according to claim 5, wherein said tetraester or diacid-diester is the methyl diester of 3,3',4,4'-tetracarboxylic acid and said aromatic diamine is 3,3'-diamino benzhydrol.

48. A composition according to claim 5, wherein said tetraester or diacid-diester is the methyl diester of 3,3',4,4'-tetracarboxylic acid and said aromatic diamine is 4,4'-diamino benzhydrol.

49. A composition according to claim 5, wherein said tetraester or diacid-diester is the methyl diester of 3,3',4,4'-tetracarboxylic acid and said aromatic diamine is 4,4'-diaminodiphenyl.

50. A composition according to claim 5, wherein said tetraester or diacid-diester is the methyl diester of 3,3',4,4'-tetracarboxylic acid and said aromatic diamine is 4,4'-diaminodiphenylsulfone.

51. A composition according to claim 5, wherein said diamine and said tetraester or diacid-diester are reacted in substantially equimolar proportions.

* * * * *

UNITED STATES PATENT AND TRADEMARK OFFICE
CERTIFICATE OF CORRECTION

PATENT NO. : 4,736,015
DATED : April 5, 1988
INVENTOR(S) : Rabilloud et al

It is certified that error appears in the above-identified patent and that said Letters Patent is hereby corrected as shown below:

Column 14, Claim 11, Line 31:

Should Read: --11. A composition according to claim 20, wherein--

Column 14, Claim 15, Line 43:

Should Read: --15. A method according to claim 18, wherein the--

Column 14, Claim 16, Line 45:

Should Read: --16. A method according to claim 18, wherein the--

Column 14, Claim 17, Line 48:

Should Read: --cess of claim 16.--

Signed and Sealed this

Thirteenth Day of March, 1990

Attest:

JEFFREY M. SAMUELS

Attesting Officer

Acting Commissioner of Patents and Trademarks